United States Patent [19]

Anthony, Jr. et al.

[11] 4,282,431
[45] Aug. 4, 1981

[54] BAR CODE SCANNER

[75] Inventors: John D. Anthony, Jr.; John J. Keegan, Jr., both of Wilmington, Del.; Jerald D. Lee, Mendenhall, Pa.

[73] Assignee: E. I. Du Pont de Nemours and Company, Wilmington, Del.

[21] Appl. No.: 86,044

[22] Filed: Oct. 18, 1979

[51] Int. Cl.³ .............................................. H01J 3/14
[52] U.S. Cl. .................................... 250/236; 235/467
[58] Field of Search ............... 250/216, 234, 235, 236, 250/566, 568; 350/6.1, 6.5, 6.6; 358/206, 207, 208; 235/464, 467

[56] References Cited

U.S. PATENT DOCUMENTS

| 4,057,784 | 11/1977 | Tafoya | 235/467 |
| 4,099,051 | 7/1978 | Gugliotta | 250/236 |

Primary Examiner—David C. Nelms

[57] ABSTRACT

A circular scan reader utilizes oscillating mirrors and associated optics to generate a circular scan pattern of laser light focused to a small spot. The angle of the scan emanating from a point just inside the reader through a window forms a conical shape which permits scanning inside a yarn tube without inserting any portion of the reader into the tube. When the scan passes over a bar coded label, the changes in reflection of light between the bars and spaces are detected by a photodetector mounted on the face of the window. These fluctuations in light which correspond in width to the bar and space width are converted to an electrical signal that is amplified, and decoded. A driver circuit for the oscillating mirrors controls the scan rate and scan pattern. The scan rate is modulated to cause a variation in the sweep depth in the tube thus providing an area scan. The area scan reduces the need for accurate label placement in the tube core.

4 Claims, 4 Drawing Figures

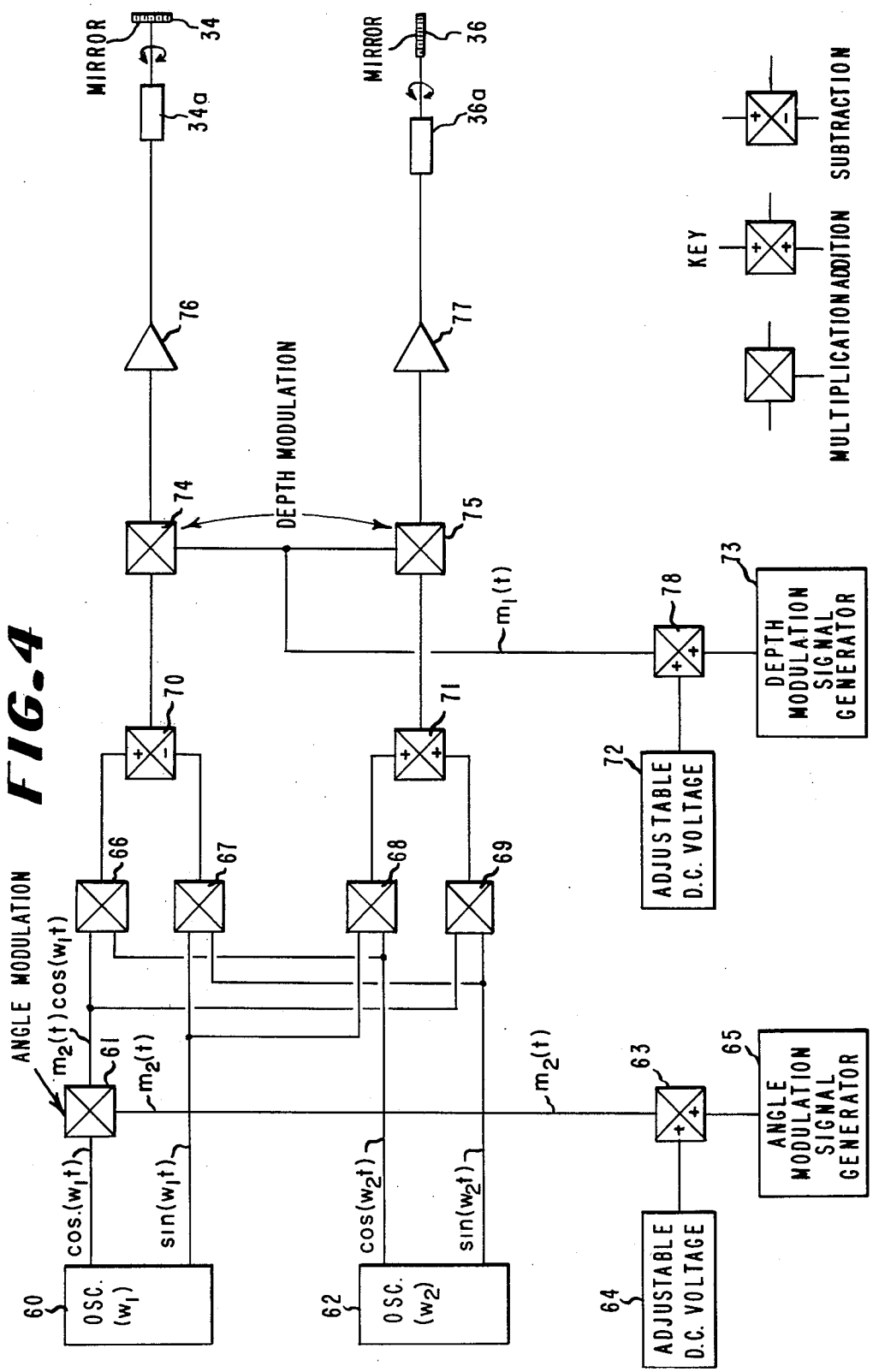

BAR CODE SCANNER

BACKGROUND OF THE INVENTION

This invention relates to optical scanning systems and more particularly to optical readers for bar coded labels located on the inside surface of a cylindrical tube.

Automatic reading of bar coded lebels located on the inner surfaces of cylindrical yarn tubes is necessary on many mechanized textile package handling systems. One example of an apparatus for scanning bar coded labels disposed on the inside surface of an open ended tube is disclosed by Herrin in U.S. Pat. No. 3,931,524. This apparatus must be moved into contact with the tube into reading relationship relative to the coded record. The movement of the apparatus into and out of engagement with the tube, if eliminated, could speed up the reading process and reduce the probability of scanning contamination by tube dust. Additionally, in practice it is probable that some labels will not be placed parallel to the tube edges and it would be desirable to scan at various angles inside the tube.

SUMMARY OF THE INVENTION

The purpose of this invention is to provide apparatus capable of reading or scanning a bar coded label adhered to the inner surface of an open ended cylindrical tube without inserting any portion of the reader into the tube and without requiring accurate label placement in the tube. A specific embodiment of the apparatus comprises a wide angle lens spaced from and closely adjacent to the tube with an optic axis that is substantially coincident with the longitudinal axis of the tube, a field lens spaced from and coaxial with the wide angle lens, and a means for generating a slightly convergent beam of light at a location spaced from the tube and said optic axis and directing the beam into a path substantially parallel to said optic axis. The apparatus further comprises a first light beam deflector positioned in the light path to receive the light and deflect it toward said optic axis and a second light beam deflector that is centrally positioned on said optic axis to receive light from the first light beam deflector and reflect it toward the field lens. Means are provided for substantially sinusoidally oscillating the first and second deflectors in a phase controlled relationship for mutually deflecting said beam along a second path which diverges from and rotates about the optic axis as it approaches the field lens. A light detector is positioned between the wide angle lens and said tube on the optic axis to receive light reflected from bar coded labels located on the internal surface of the tube. A signal decoder is coupled to the light detector for comparing relative widths and spacings of the detected bars of the bar coded labels.

BRIEF DESCRIPTION OF THE DRAWINGS

FIG. 4 is a block diagram of another driver circuit for the oscillating mirrors of FIG. 2.

DETAILED DESCRIPTION OF THE PREFERRED EMBODIMENT

Figure 1:
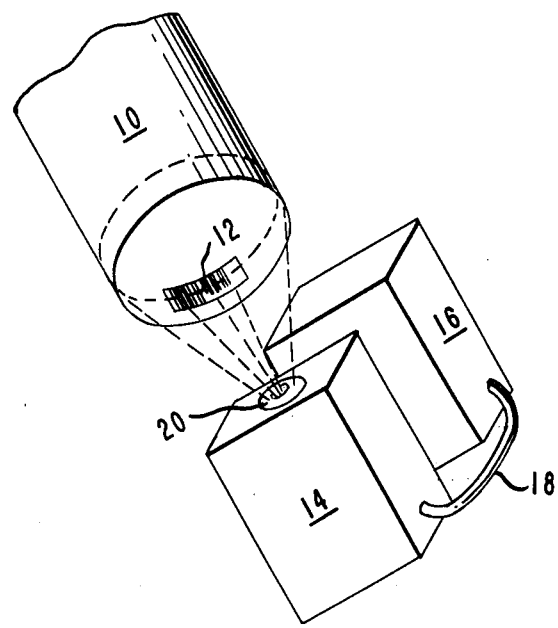
FIG. 1 is a perspective view of the apparatus of this invention with relation to a yarn tube.

Referring to FIG. 1, the apparatus generally includes an optics unit 14 connected to a decoding unit 16 via cable 18. The optics unit is shown in position to scan through window 20 an open-ended tube 10 having a bar coded label 12 adhered to its inner surface.

Figure 2:
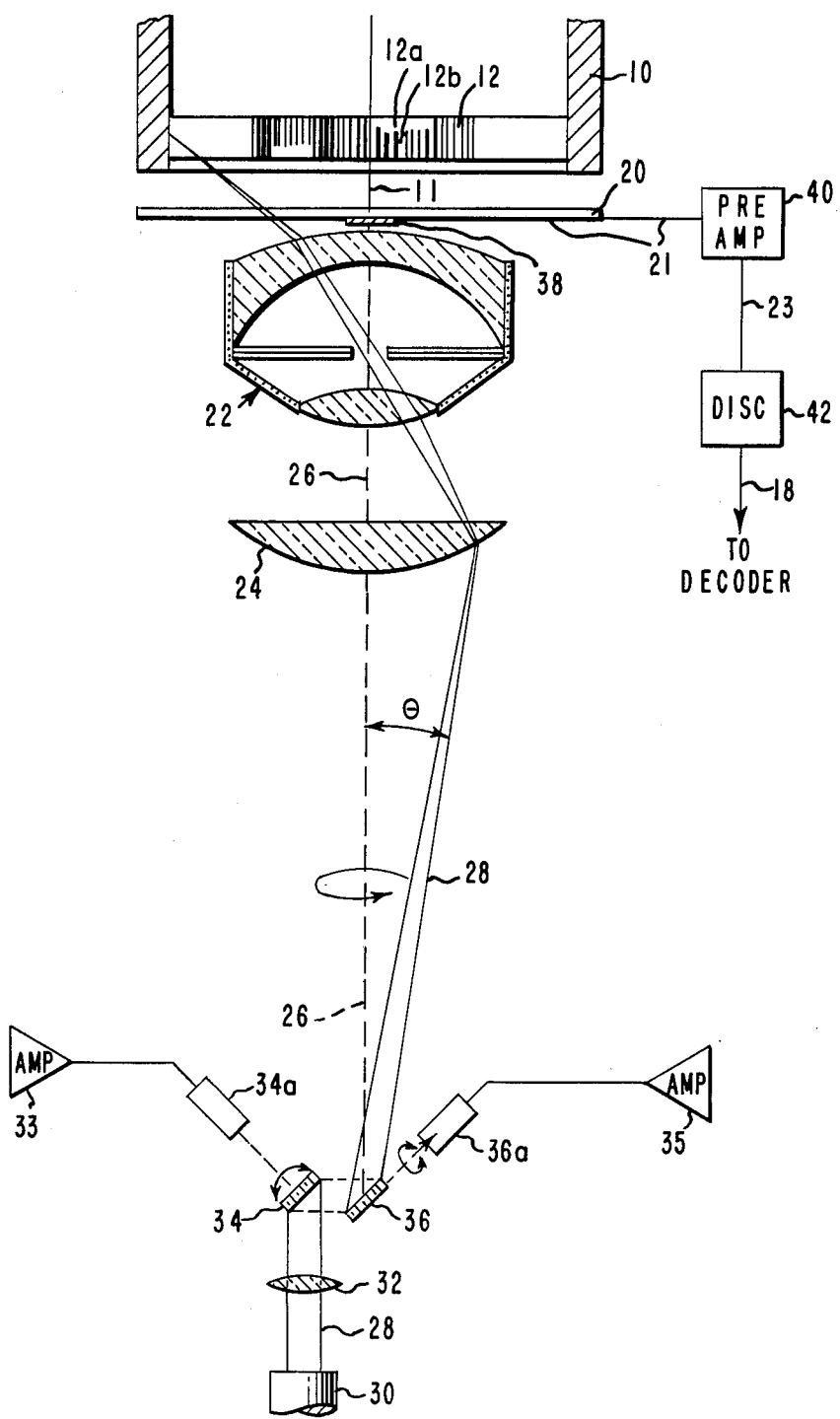
FIG. 2 is a schematic illustration of the optics portion of the apparatus including the light detector with relation to a yarn tube.

FIG. 2 schematically shows the optics unit 14 in more detail wherein tube 10 with its label 12 is positioned centrally with respect to window 20 so that its longitudinal axis 11 is substantially coincident with the optical axis 26 of wide angle lens 22 (e.g. Minolta Rokkor-X 16 mm×F 2.2) and the associated coaxial field lens 24 located below window 20. A means for generating a slightly convergent beam of light 28 is seen to comprise a laser tube 30 (e.g. model 3203H-COl Hughes Aircraft Co.) and its converging lens 32 which directs the beam 28 in a path substantially parallel to the optic axis 26 of the wide angle and field lens system 22, 24. A first light beam deflector 34 is positioned in the path of the light beam 28 from laser tube 30 to deflect the beam from its initial path toward optic axis 26 where it is received by a second light beam deflector 36 which reflects the light beam along a second path which diverges from the optic axis 26 at angle $\theta$ and rotates about it as it passes through the field lens 24, the wide angle lens 22, the window 20 and on the inner surface of tube 10. Finally, a light detector 38 (e.g. United Detector Technology UDT#6D modified to 0.125" cap height) is positioned between lens 22 and the tube 10 on the optic axis 26. The detector is mounted on the glass window 20 so that laser beam 28 may scan around the detector without interruption. This is accomplished by using transparent conductive leads 21 on the glass window 20. The glass has a conductive and transparent tin oxide coating on its surface that has a resistance of 20 to 300 ohms per square. Portions of the coating are etched away with a heterogeneous mixture of muriatic acid and zinc powder to form the portion of the leads 21 which are connected to the detector. The leads 21 connect the detector to a preamplifier 40 which in turn is connected to a discriminating circuit 42.

Figure 3:
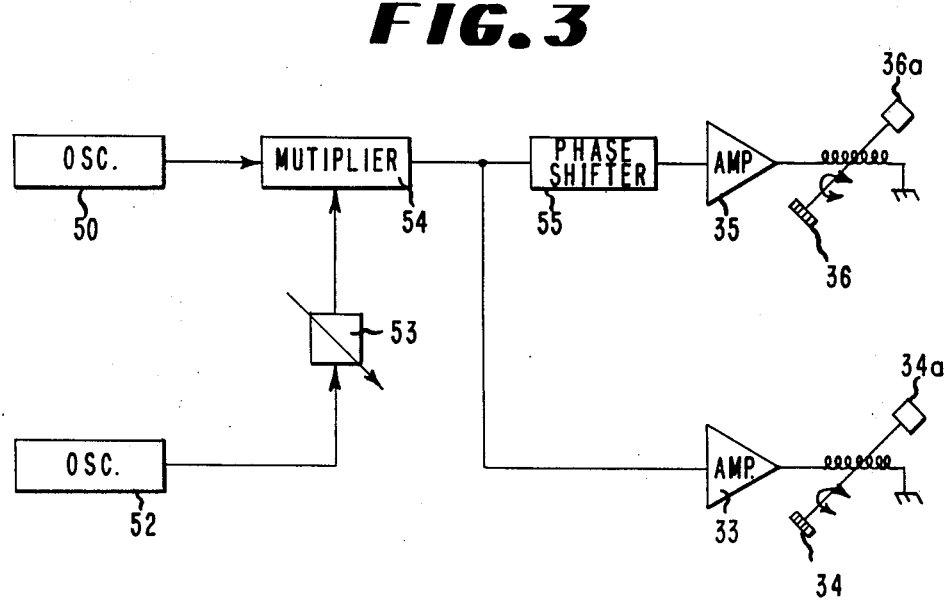
FIG. 3 is a block diagram of the driver circuit for the oscillating mirrors shown in FIG. 2.

The light beam deflectors 34, 36 are mirrors driven by respective galvanometer motors 34a, 36a which in turn are driven by signals from amplifiers 33 and 35, respectively. Typically the light beam deflectors are the type supplied by General Scanning Inc., Motor Model G-115 with an M-2-1010-00 mirror and a 10B mount. The signals substantially sinusoidally oscillate mirrors 34, 36 in a phase controlled relationship. This term "substantially sinusoidally" includes the situations where the oscillations from amplifiers 33, 35 are of equal amplitude and 90 degrees out of phase with each other so that beam 28 traces a circle inside tube 10 and where the oscillations are of unequal amplitudes and an ellipse is traced. If the amplitude ratio of the oscillations is constant but amplitudes vary, the trace pattern of beam 28 moves helically up or down the tube. This scan pattern covers most conditions of normal placement of labels. However, severely skewed labels cannot be completely scanned without further scan control. If an addition to the latter condition amplitude ratios also vary, continuously varying ellipse-shaped traces are generated. Finally, imposing a phase retardation variation on both oscillations from 33, 35 causes the traces to precess around the inside of the tube as well. In this approach the beam scans severely skewed labels as well as normally placed labels. Means to provide these substantially sinusoidal signals are described hereinafter. As for example, in FIG. 3 oscillator 50 (e.g. No. BB-4423 Burr-Brown Research Corp.) is connected to a multiplier 54 then to a phase shifter 55 which feeds amplifier 35 that drives mirror 36. Similarly, oscillator 52 (BB-4423) is connected to multiplier 54 (e.g. BB-4203J Burr-Brown Research Corp.) but through attenuator 53 and multiplier 54 feeds amplifier 33 that drives mirror 34. In operation of this circuit the sinusoidal signal from oscillator 50 is multiplied in multiplier 54 by a triangular shaped signal generated in oscillator 52. This results in a sinusoidal wave form which changes in amplitude at a constant rate between two boundary amplitudes. The modulated sine wave is then phase shifted in phase shifter 55 and then amplified to drive mirror 36 while the nonphaseshifted signal out of multiplier 54 is amplified to drive mirror 34. In operation the scanner shown in FIG. 3 utilizes mirrors 34, 36 and associated wide angle lens 22 along with its field lens 24 to generate a circular pattern of laser light focused to a small spot on the inside surface of tube 10 with a spiral scan. More particularly, the spiral scan is obtained by oscillating mirrors 34, 36 sinusoidally with a 90° respective phase shift while simultaneously and slowly varying the amplitude of both sinusoidal waves. The first action produces a circle according to the well known Lissajous principle, while the latter action slowly changes the diameter of the circle. The result is a spiral scan in the tube. It is important that a substantially 90° phase shift be maintained between the sinusoidal movement of the two mirrors while the amplitude of the sinusoidal waves change. When the scan passes over bar coded label 12, he changes in reflection between the bars 12a and the spaces 12b are detected by photodetector 38 mounted on the face of window 20 and converted to a signal which is amplified in preamplifier 40 and then converted to a digital signal in discriminator 42. This digital signal represents the label code where a 0 volt signal level corresponds to white or a space and +2 volts corresponds to black or a bar. The widths of the signals are proportional to the widths of bars and spaces. The digital signal is then transmitted over cable 18 to a decoder such as used in the MRC-8000 series scanner/decoder and with Accusort 5500 moving beam scanners.

The mathematical description of the electrical drive signals from the apparatus of FIG. 4, which may be used for scanning skewed labels, is given below. The x and y signals which generate the pattern of a precessing ellipse are:

$$x(t) = A \cos w_1 t \cos w_2 t - B \sin w_1 t \sin w_2 t \quad (1)$$

$$y(t) = A \cos w_1 t \sin w_2 t + B \sin w_1 t \cos w_2 t \quad (2)$$

where:
$W_1$ = scanning frequency
$w_2$ = precession frequency
(A) and (B) are constants proportional to the lengths of the major and minor axes of the precessing ellipse.

Means to provide these signals are described in connection with FIG. 4. Equations (1) and (2) may also be written as $$x(t) = m_1[m_2 \cos w_1 t \cos w_2 t - \sin w_1 t \sin w_2 t] \quad (3)$$

$$y(t) = m_1[m_2 \cos w_1 t \sin w_2 t + \sin w_1 t \cos w_2 t] \quad (4)$$

where:
($m_1$) is a proportionality constant which determines the overall size of the ellipse.
($m_2$) is a constant which determines the scanning angle by controlling the shape of the ellipse.
It is equal to the ratio of the lengths of the axes of the ellipse (i.e. $m_2 = A/B$).

To automatically scan at different angles and tube depths the constants ($m_1$) and ($m_2$) must be varied with time. Designating ($m_1$) and ($m_2$) as functions of time the equations become:

$$x(t) = m_1(t) [m_2(t) \cos w_1 t \cos w_2 t - \sin w_1 t \sin w_2 t] \quad (5)$$

$$y(t) = m_1(t)[m_2(t) \cos w_1 t \sin w_2 t + \sin w_1 t \cos w_2 t] \quad (6)$$

The modulating functions $m_1(t)$ and $m_2(t)$ may be chosen according to the type of label and tube being scanned.

Oscillators 60 and 62 (Burr-Brown Model 4423) generate the sine and cosine terms of the scanning frequency ($w_1$) and the precession frequency ($w_2$). The amplitude of the term $\cos w_1 t$ is modulated at multiplication circuit 61 (Burr-Brown 4203J) by the function $m_2(t)$ from addition circuit 63 (Texas Instrument TL083CN) to achieve variation of scanning angle. The modulating function $m_2(t)$ is the sum of a DC voltage from adjustable DC voltage source 64 which establishes the initial scanning angle plus a periodic component from signal generator 65 which varies the scanning angle about that set point.

The sine and cosine terms generated by the oscillators are then multipled in multipliers 66, 67, 68, 69 to form the terms as indicated below at these locations. The signal from 66 is subtracted from the signal from 67 in subtraction circuit 70 (Texas Instrument TL083CN). The signals at the outputs of multipliers 68 and 69 are summed in addition circuit 71.

The amplitudes of the signals in 70 and 71 are modulated by the function $m_1(t)$ to achieve variation in the scanning depth. The modulating function $m_1(t)$ is the sum of a DC voltage which establishes the initial tube depth of scan plus a periodic component which varies the tube depth of scan about that set point, i.e., adjustable voltage source 72 plus output of signal generator 73 as combined in addition circuit 78. The signals at multipliers 74, 75 result from the depth modulation. Before being applied to the "x" and "y" galvanometers these signals are buffered in amplifiers 76, 77 (National Semiconductor LH0021) to increase their power. These signals are supplied directly to the "x" and "y" galvanometers 34a, 36a. Galvanometer mirrors 34, 36 generally are capable only of substantially sinusoidal oscillations. Thus, while any shape, size, or angular retardation of the trace may be provided, it is important that variations in time-dependent "constants" $m_1$ and $m_2$ be continuous and gradual.

The equations describing the signals at the output of each element are shown below.

| Element No. | Signal - Equation |
|---|---|
| 66 | $m_2(t) \cos w_1 t \cos w_2 t$ |
| 67 | $\sin w_1 t \sin w_2 t$ |
| 68 | $\sin w_1 t \cos w_2 t$ |
| 69 | $m_2(t) \cos w_1 t \sin w_2 t$ |
| 70 | $m_2(t) \cos w_1 t \cos w_2 t - \sin w_1 t \sin w_2 t$ |
| 71 | $m_2(t) \cos w_1 t \sin w_2 t + \sin w_1 t \cos w_2 t$ |
| 74 | $m_1(t) [m_2(t) \cos w_1 t \cos w_2 t - \sin w_1 t \sin w_2 t]$ |

| Element No. | Signal - Equation |
| --- | --- |
| 75 | $m_1(t) [m_2(t) \cos w_1 t \sin w_2 t + \sin w_1 t \cos w_2 t]$ |

We claim:

1. An apparatus for scanning light reflective bar-coded lables located on the internal surface of a tube and for providing coded signals, said apparatus comprising:
   a wide angle lens having an optic axis, said lens being proximate said tube, said optic axis and the longitudinal axis of said tube being substantially coincident;
   a field lens spaced from and coaxial with said wide angle lens;
   means for generating a slightly convergent beam of light at a location spaced from said tube and said optic axis and for directing the beam into a path substantially parallel to said optic axis;
   a first light beam deflector positioned in said path to receive the beam of light and deflect it away from said path toward said optic axis;
   a second light beam deflector centrally positioned on said optic axis to receive the light from the first light beam deflector and reflect it toward said field lens so that all the light is received by said field lens;
   means for substantially sinusoidally oscillating said first and second deflectors in a phase controlled relationship for mutually deflecting said beam along a second path which diverges from and rotates about said optic axis as it approaches said field lens; and
   a light detector positioned between said wide angle lens and said tube on the optic axis to receive light reflected from the bar-coded labels located on the internal surface of the tube and to provide coded signals.

2. The apparatus as defined in claim 1, said wide angle lens being a fish-eye lens.

3. The apparatus as defined in claim 1, said means for generating a slightly convergent beam of light comprising a laser tube and a converging lens.

4. The apparatus as defined in claim 1, including a signal decoder coupled to said light detector.

* * * * *